July 23, 1968  C. FREDA  3,393,458

PROTRACTOR AND CHART CASE

Filed July 7, 1966  2 Sheets-Sheet 1

INVENTOR.
CARMINE FREDA

BY his ATTORNEYS

July 23, 1968  C. FREDA  3,393,458
PROTRACTOR AND CHART CASE
Filed July 7, 1966  2 Sheets-Sheet 2
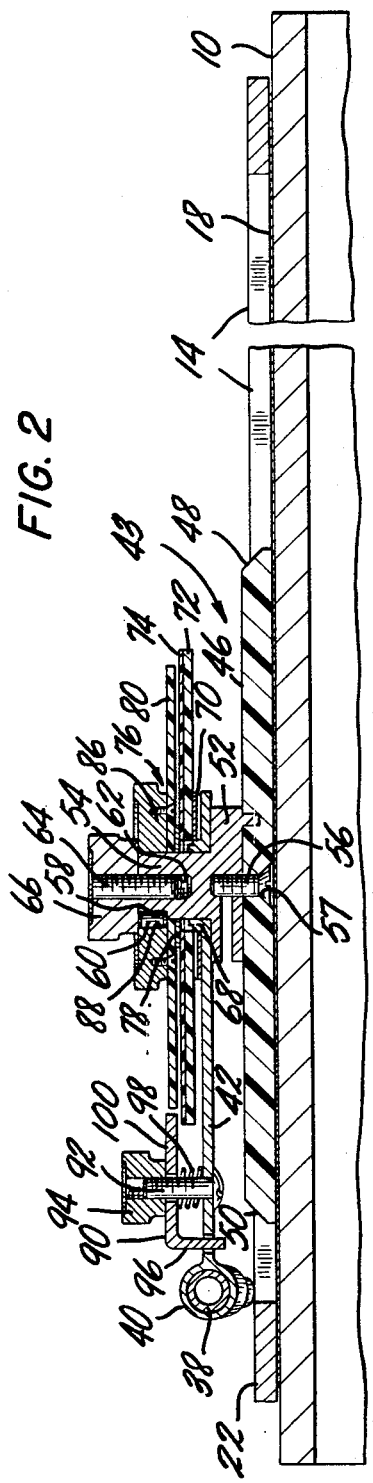
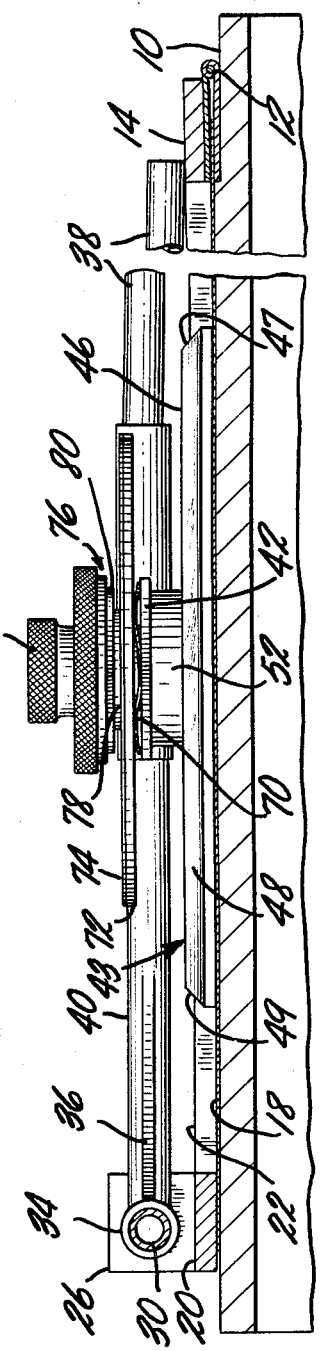
INVENTOR.
CARMINE FREDA
BY
his ATTORNEYS

United States Patent Office 3,393,458
Patented July 23, 1968

3,393,458
PROTRACTOR AND CHART CASE
Carmine Freda, River Road, Grandview-on-the-Hudson, N.Y.
Filed July 7, 1966, Ser. No. 564,513
3 Claims. (Cl. 33—76)

ABSTRACT OF THE DISCLOSURE

As described herein, the plotting device comprises a chart board having a frame and a protractor mechanism supported from the frame for rectilinear motion with respect thereto wherein the protractor mechanism includes a rectangular straight edge member and a pointer device supported for rotation and a protractor disc mounted for rotation about the same axis as the straight edge member. Preferably independent clamping mechanisms are provided for the straight edge member and the protractor disc. In one embodiment of the invention, the protractor mechanism comprises a transparent rotatable straight edge member held in a fixed relation with a rotatable indicator member and a rotatable protractor disc interposed between the straight edge member and the indicator member and including graduations from 0° to 360°. The indicator member includes a pointer with diametrically opposite reference lines in order to facilitate the alignment of the indicator member with the graduations of the protractor disc. When the indicator member is turned to a particular reading on the protractor disc, the straight edge member provides two edges along which lines can be drawn which correspond to the angle indicated by the indicator member.

---

This invention relates to drafting instruments and, more particularly, to plotting devices for determining the course from one position to another on a given chart.

Navigation charts which contain a network of latitude and longitude lines are extremely important in the operation of both large and small craft. Course lines, lines of direction and other data are ordinarily plotted directly on the chart so as to give the operator a graphic representation of his position and the relation of his craft to landmarks and other navigational aids. To this end, directions are usually plotted by means of a parallel ruler (a device which can be moved parallel to itself) or a drafting machine (a device which combines parallel motion with direction indication). Drafting machines are ordinarily quite large and therefore find extensive use in larger craft wheerin space requirements are not critical. Parallel rulers, on the other hand, are relatively small and find use in smaller craft wherein the working areas of the craft are restricted in size.

Of the presently devised parallel rulers, many have proven to be quite cumbersome in operation due to the fact that they are dependent upon size for the drafting of course lines rather than mobiilty of movement in both vertical and horizontal directions. Other rulers fail to provide easy-to-operate structure for correcting for magnetic variations in different geographical locations. Still others require additional drafting implements for the plotting of bearing lines for an object which is obliquely removed from a given reference point.

Accordingly, it is an object of the present invention to provide a compact and convenient plotting device which can be simply operated and which at the same time provides structure for the drafting of course lines and lines of direction.

It is another object of the invention to provide a plotting device for determining the compass course from one position to another on a given chart, which course may have a full 360° of angular reference to a latitude line or a meridian of longitude according to the location of two points upon a chart.

It is still another object of the invention to provide a plotting device for use in a small craft for determining location of the craft from a compass reading of two other points on the chart.

These and other objects of the invention are accomplished by providing a plotting device comprising a chart board having a frame and a protractor mechanism supported from the frame for rectilinear motion with respect thereto wherein the protractor mechanism includes a rectangular straight edge member and a pointer device supported for rotation and a protractor disc mounted for rotation about the same axis as the straight edge member. Preferably independent clamping mechanisms are provided for the straight edge member and the protractor disc. In one embodiment of the invention, the protractor mechanism comprises a transparent rotatable straight edge member held in a fixed relation with a rotatable indicator member and a rotatable protractor disc interposed between the straight edge member and the indicator member and including graduations from 0° to 360°. The indicator member includes a pointer with diametrically opposite reference lines in order to facilitate the alignment of the indicator member with the graduations of the protractor disc. When the indicator member is turned to a particular reading on the protractor disc, the straight edge member provides two edges along which lines can be drawn which correspond to the angle indicated by the indicator member.

Further objects and advantages of the invention will be apparent to those skilled in the art from a reading of the following detailed description of a typical embodiment, taken with reference to the accompanying drawings, in which:

FIGURE 2 is a view in cross-section taken along the line 2—2 of FIGURE 1 and looking in the direction of the arrows; and FIGURE 3 is a cross-sectional view taken along the line 3—3 of FIGURE 1.

Figure 1:
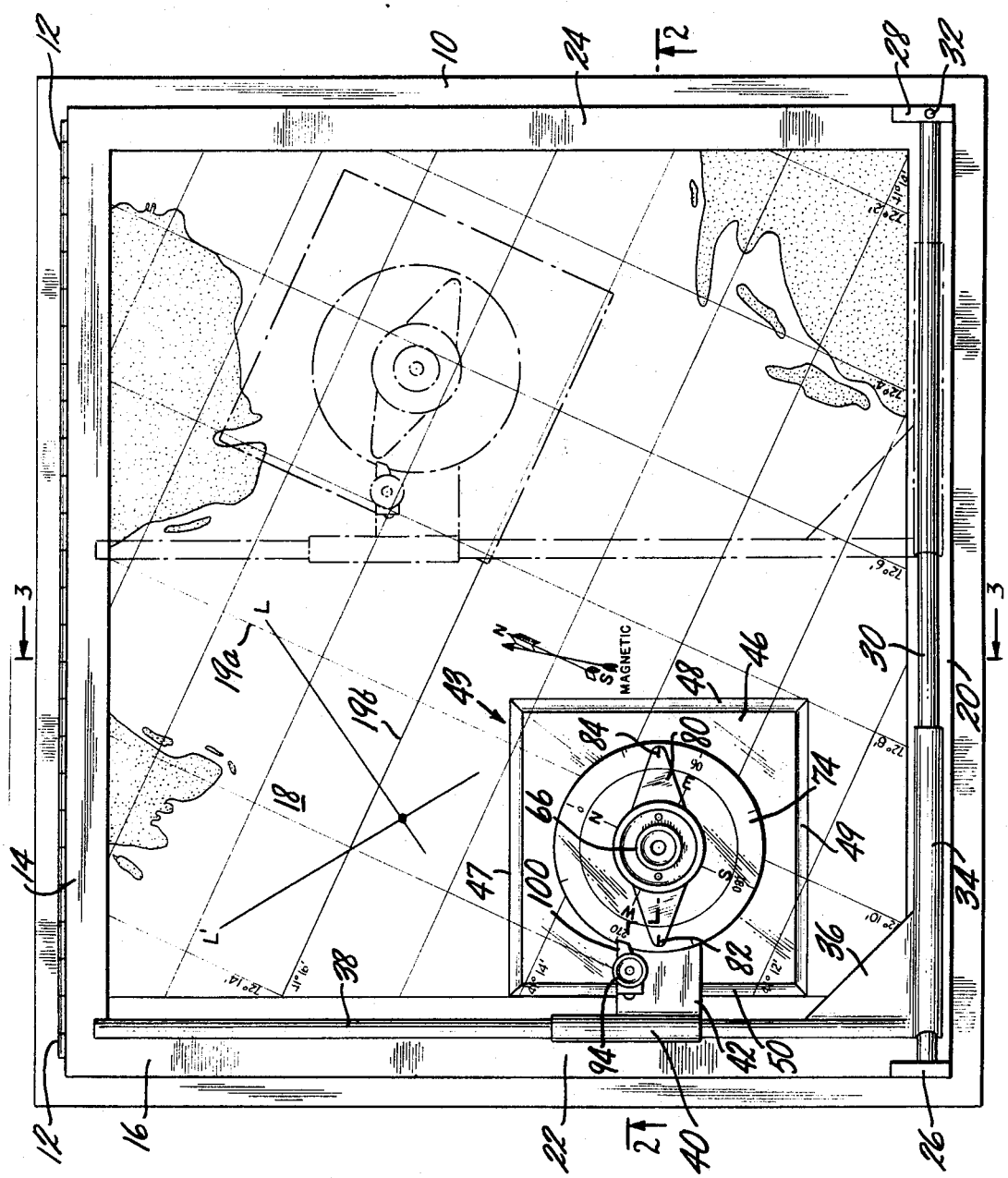
FIGURE 1 is a plan view of an illustrative embodiment of the present invention.

In the representative plotting device according to the present invention shown in the drawings, the foundation or base comprises a lower plate 10 formed of a suitable wood. Plastic or metal may also be used if desired. At the top of the plate 10 as viewed in FIGURE 1, a hinge 12 extends substantially across the upper lateral member 14 of a frame 16 and affixes the member 14 to the base plate so that the frame may be raised away from the base plate. A chart 18, bearing a grid of lines of longitude 19a and latitude lines 19b, may be easily placed on the plate 10 by rotating the frame 16 upwardly and inserting the chart beneath it. When the frame is lowered into position, the upper member 14 of the frame rests upon the upper portion of the chart 18 and the lower lateral member 20 and the longitudinal side members 22 and 24 of the frame 16 rest upon the corresponding edges of the chart 18. The weight of the frame 16 is sufficient to hold the chart in position against the base plate 10 and prevent slipping of the chart. The frame 16 is preferably formed of metal although it may be formed of heavy duty plastic or the like.

Affixed to the opposite ends of the lower member 20 of the frame are two upright flanges 26 and 28, each with a circular bore for receiving a cylindrical bar 30 which extends above the member 20. The bar 30 is held in position in the flanges 26 and 28 by a lock screw 32 in the flange 28. As is the case with the frame 16, the bar 30 is preferably formed of metal although it may be formed of heavy duty plastic or the like.

A sleeve 34, preferably made of metal, is fitted about the bar 30 in such a manner that it slides freely, but without play, along the bar. Brazed or welded to the sleeve 34 are a generally triangularly shaped brace 36 and one end of a second cylindrical bar 38, the bar 38 extending from the sleeve 34 to the bar 30 so as to rest at its other end upon the upper lateral member 14 of the frame 16. The bar 38 is also brazed or welded to the vertical edge of the brace 36. It can thus be seen that, as the sleeve 34 moves laterally along the bar 30, the longitudinally extending bar 38 will similarly move laterally across the chart 18 while being held in perpendicular relation to the bar 30.

Fitted about the bar 38 is a second sleeve 40 which moves freely, but without play, along the bar 38. The sleeve 40 is brazed or welded to a support or bracket arm 42 of a protractor mechanism 43 so as to enable the mechanism 43 to move freely in the longitudinal direction, motion in the lateral direction being permitted by the other sleeve 34.

As best shown in FIGURES 2 and 3, the protractor mechanism 43 comprises a straight edge member 46, formed of transparent plastic material, having a generally square shape. The member 46 has beveled or chamfered surfaces 47, 48, 49 and 50 along its sides which, as can be appreciated, facilitate the drafting of course lines, lines of direction and the like.

As best seen in FIGURES 2 and 3, the member 46 is affixed to a circular undercarriage 52 at the lower end of a vertical shaft 54 by a screw 56 which engages a cutout 57 in the member 46 and threadedly engages a central bore in the shaft 54. The shaft 54 includes one-half of a cylindrical key way 58 formed in the outer periphery thereof and extending from the top of the shaft 54 toward the middle portion thereof for receiving a cylindrical key pin 60. The shaft 54 also has a threaded central bore 62 for threadedly receiving a threaded extension 64 of a knurled lock knob 66. Mounted around the shaft 54 and atop the circular undercarriage 52 is the support or bracket arm 42 which connects the mechanism 43 to the sleeve 40. The arm 42 includes a spacer in the form of a hollow circular plug 68, brazed or welded to the arm 42, which fits around the shaft 54 and extends through and slightly beyond the horizontal plane of the arm 42.

A support disc 72, preferably formed of plastic, is mounted around the plug 68 and carries a graduated protractor scale 74, which may be affixed, for example, by the application of epoxy to the top surface of the support disc 72. It is preferable that the protactor disc 74 have a north indication as N at the zero point as shown in FIGURE 1. The graduations progress clockwise so that 90° east (E) is to the right of north, south (S) is at 180° and west (W) is at 270°. Interposed between the plug 68 and an indicator assembly 76 of the protractor mechanism 43 is a preferably metallic washer 78 which is sized to fit around the shaft 54 and atop the plug 68 of the support arm 42.

The indicator assembly 76 includes a transparent plastic pointer 80 (FIG. 1) with radial reference lines 82 and 84 at its opposite ends which extend parallel to two of the edges 47 and 49 of the straight edge member 46 and perpendicular to the other two edges 48 and 50 of the member, the indicator being bolted to a metallic knurled knob 86. To this end, the knob 86 includes one-half of a cylindrical keyway 88 formed in the central bore portion of the knob for mating with the one-half keyway 58 formed in the shaft 54. When the pin 60 is inserted into the keyway (formed of the half keyways 88 and 58), the pin locks the pointer member 76 to the shaft 54 and thereby prevents rotational movement of the shaft relative to the pointer member. It can be seen, therefore, that the straight edge member 48 which is bolted to the shaft 54, and the pointer 80 are joined and can be moved together in a fixed angular relationship whenever the lock knob 66 is loosened. When the knob 66 is tightened so as to clamp the assembly 76 and the washer 78 against the top of the plug 68 and the top of the undercarriage 52 against the arm 42, rotation of the straight edge member 48 and the pointer 80 is prevented.

It is noteworthy that the protractor disc 74 and its support disc 72 remain free to rotate about the plug 68 of the arm 42 when the knob 66 is tightened, unless they are held by another clamp 90 as described hereinafter. This is true since the pressure exerted by the tightening of the knob 66 bears upon the top surface of the plug 68 rather than on the protector disc 74. The washer 78 acts to maintain the protractor disc 74 and its support disc 72 within the confines of the height of the plug 68 and the spring washer 70 acts to force the disc 74 and support disc 72 against the washer 70, allowing them to rotate smoothly and uniformly but without tilting.

In order to secure the joined discs 72 and 74 in a fixed position relative to the support arm 42, the mechanism 43 further comprises a spring-biased generally L-shaped clamp 90 affixed to the support arm by a threaded bolt 92 and a knurled knob 94 having an inner bore suitable for threaded engagement with the bolt 92. The shorter leg 96 of the clamp 90 is generally T-shaped such that only a part of the leg 96 extends through a bore in the arm 42 which is sized to receive the leg 96. The spring 98 of the clamp is mounted around the bolt 92 and interposed between the longer clamp leg 100 and the support leg 42 to support the leg 100 and prevent its riding along the edge of the protractor disc 74 when the knob 94 is loosened. When the knob 94 is tightened, the knob forces the leg 100 downwardly against the disc 74, thereby compressing the discs 72 and 74 between the clamp leg 100 and the support arm 42 and preventing rotational movement of the protractor discs 72 and 74.

In operation, the first step is to rotate the frame 16 from the horizontal plane to an oblique plane, inserting the chart 18 of a particular territory onto the base plate 10 of the plotting device and then lowering the frame 16 into place. As mentioned above, the frame 16 holds the chart 18 firmly against the lower plate 10 and prevents slippage of the chart along the lower plate. In order to plot the position of a craft relative to two known and observed objects laid down on the chart 18, for example, the lighthouses L and L', the scale 74 is first set to align the zero degree graduation with magnetic north as depicted on the chart. For this purpose the protractor straight edge member 46 is turned to align the edges 47 and 49 with the meridian lines 19a on the chart and the knurled knob 66 is then tightened to lock the straight edge member and the indicator 80 in fixed angular position. The protractor scale 74 is then turned until the zero graduation is oriented toward magnetic north or, in other words, until the variation between magnetic north and true north is indicated on the protractor scale by the indicator line 82 or 84. If the chart has a line indicating magnetic north, the straight edge member may initially be set to the line and the protractor turned until the zero graduation is aligned with the line 82 or 84. Thereafter, the knob 94 is turned to tighten the clamp 90 and lock the scale 74 in place.

A compass reading is then taken on both the lighthouses L and L'. For the purposes of illustration, assume that the lighthouse L bears northeast at 47°30' from the craft and the lighthouse L' bears northwest at 305°. Thereafter, the knob 66 of the mechanism 43 is loosened, and the knob 86 of the indicator member 76 is turned until the graduation 84 of the pointer 80 is positioned directly over the reading 47°30' on the protractor disc 74. After tightening the knob 66, the protractor assembly 43 is moved laterally and longitudinally (which is easily accomplished by the movement of sleeve 40 along tube 38 and the movement of sleeve 34 along the tube 30) until the lighthouse L is positioned at a point along the edge 47 of the straight edge member 46. From the lighthouse L, a line is drawn along the edge 47 in a southwesterly direction. The knob 66 is again loosened and the knob 86 is rotated counterclockwise until the graduation 84 of the pointer is positioned directly over the reading 305° on the protractor disc 74. Thereafter, the knob 66 is tightened, again locking the indicator member 78 and the straight edge member 46. As above, the straight edge 46 is moved to a point where the lighthouse L' is positioned along the edge 47 of the straight edge 46 and a line is drawn from the lighthouse L' in a southeasterly direction. The point at which the two lines drawn from each lighthouse intersect indicates the exact position of the craft.

To further illustrate the operation of the plotting device of the instant invention, assume that the position of he craft is known and it is desired to ascertain the bearing of another craft or navigational aid depicted on the chart. The disc 74 is again adjusted to align the zero degree graduation toward magnetic north with respect to the chart. Thereupon, the knob 66 is loosened and the indicator 76 is rotated until the unknown craft or aid and the position of the craft are located along the same edge of the straight edge member 46. The knob 66 is tightened and the bearing angle of the unknown object is read from the protractor disc 74. Either the reference line 84 of the pointer 80 will provide the true bearing angle of the object and the reference line 82 the complement thereof, or the reference line 82 will provide the true bearing angle and the reference line 84 will provide the complement thereof, depending upon the location of the craft with respect to the unknown craft or navigational aid.

It will be understood that the above-described invention is illustrative only and susceptible to considerable modification. Accordingly, all modifications and variations within the skill of the art are included within the spirit and intended scope of the invention as defined by the following claims.

I claim:

1. A plotting device for plotting course lines on navigation charts comprising a base member for receiving a chart; a frame pivotally attached to the base member for maintaining the chart against the surface of the base member in a slip-free relation, the frame including a shaft member affixed to opposite edges of said frame and traversing thereacross; a slide member mounted on said shaft member and secured to a second rod member extending perpendicularly from the slide member and across the chart and including a second slide member mounted thereon; and a rotatable protractor mechanism affixed to the second slide member for the drafting of course lines on said chart, the protractor mechanism comprising a generally rectangular straight edge member having beveled edges along which lines can be drawn, an axial shaft affixed to the straight edge member, an indicator member mounted around the axial shaft and having reference lines at diametrically opposite positions, means forming a key way in the outer periphery of the shaft and in the inner bore of the indicator member, a pin member for mounting in the key way for precluding relative rotational movement between the indicator member and the straight edge member, locking means for locking the straight edge member in fixed angular position with respect to the frame, spacer means attached to the second slide member and mounted around the axial shaft between the indicator member and the straight edge member, and a rotatable protractor disc mounted on the spacer means and independently operative from the straight edge member notwithstanding the locking thereof in fixed angular position by the locking means for providing an angular reference for the indicator member and facilitating the drafting of lines along the edges of the straight edge member.

2. A plotting device according to claim 1, wherein the protractor mechanism is affixed to the second slide member by a bracket arm and the spacer means comprises a plug formed in the bracket arm and having a central bore formed therein for mounting around the axial shaft and wherein the protractor mechanism further comprises a spring-biased clamp member secured to the bracket arm for maintaining protractor disc against rotational movement.

3. A plotting device according to claim 1, wherein the rotatable protractor disc includes graduations from 0° to 360° and the reference lines at opposite positions on the indicator member extend in perpendicular relation to one pair of opposite edges of said straight edge member and in parallel relation to the second pair of opposite edges and facilitate alignment of the indicator member with the graduations of the protractor disc.

References Cited

UNITED STATES PATENTS

| | | | |
|---|---|---|---|
| 932,907 | 8/1909 | Rydman | 33—75 |
| 964,773 | 7/1910 | Guillo | 33—80 |
| 1,436,415 | 11/1922 | Sullivan | 33—80 |

HARRY N. HAROIAN, *Primary Examiner.*